UNITED STATES PATENT OFFICE.

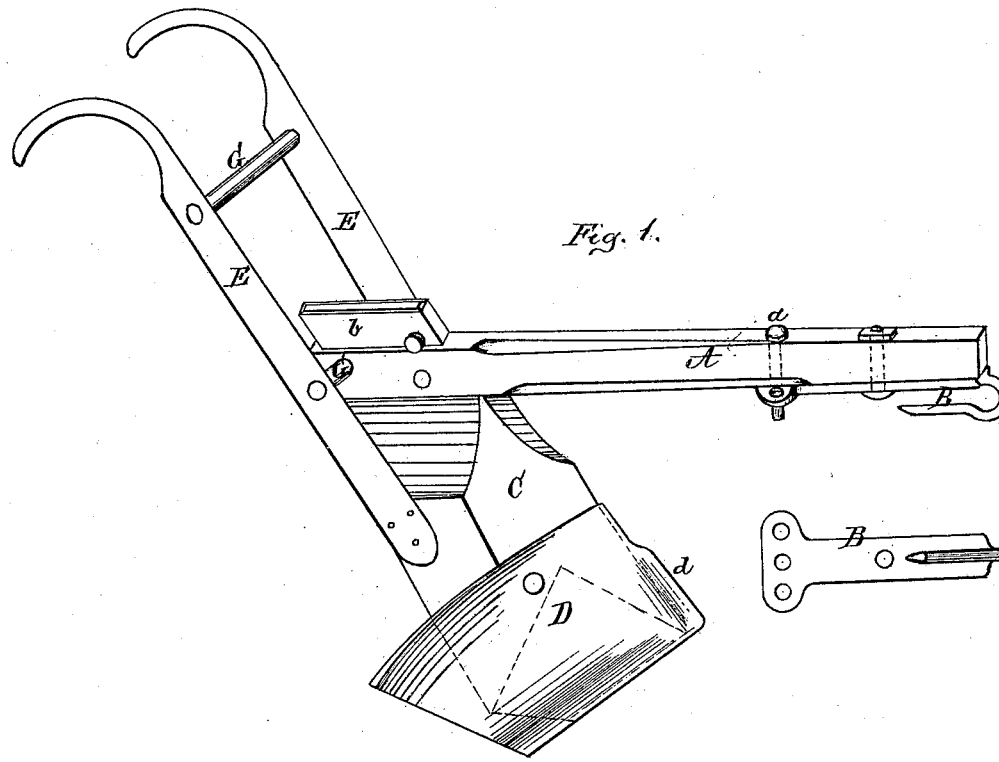
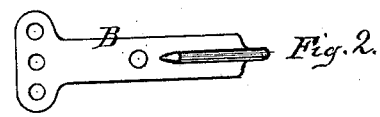
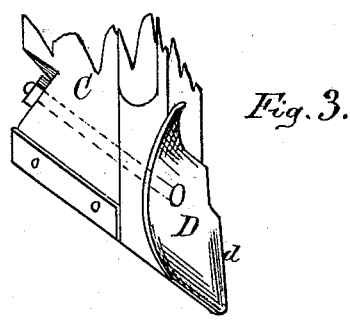

GEORGE MILLIORN, OF PYHALIA, MISSISSIPPI, ASSIGNOR TO HIMSELF AND P. T. RAIFORD, OF SAME PLACE.

IMPROVEMENT IN CORN AND COTTON SCRAPERS.

Specification forming part of Letters Patent No. 109,334, dated November 15, 1870.

*To all whom it may concern:*

Be it known that I, GEORGE MILLIORN, of Pyhalia, in the State of Mississippi, have invented certain new and useful Improvements in Corn and Cotton Scrapers; and I do hereby declare that the following is a full, clear, and exact description thereof, reference being had to the accompanying drawings, and to the letters of reference marked thereon, which form a part of this specification.

The nature of my invention consists in the construction and arrangement of a scraper for corn, cotton, or other articles, as will be hereinafter fully set forth.

In order to enable others skilled in the art to which my invention appertains to make and use the same, I will now proceed to describe its construction and operation, referring to the annexed drawings, in which—

Figure 1 is a side view of the entire machine. Fig. 2 is a plan view of the hook or clevis, and Fig. 3 is a perspective of the lower end of the scraper-block.

A represents the beam, to which the horse is attached by means of the clevis B at its front end. This clevis is pivoted at about its center on the under side of the beam, and its rear end is enlarged or spread out toward both sides, with holes through it. A pin, $a$, is then passed through the beam A and one of the holes in the rear end of the clevis. By moving this pin the horse can be changed from the side of the row to the middle, and the horse can be made to walk up against the row or as far from it as may be desired.

Through the rear end of the beam A is a mortise, in which is inserted the tenon $b$ of the scraper-block C, and secured by any suitable and convenient means. The construction of this block is fully shown in the drawings, its angle being only about forty and one-half degrees.

The scraper-blade D is so arranged upon the block C as to be only about one inch in rear, the balance in front. The upper rear edge of the blade is curved, turning over forward like a turning-plow, and at its forward edge is a cutting-projection, $d$, extending halfway up from the lower corner.

The handles E E are secured to the block C, and suitably braced by connecting-rods G G, one of which passes through the beam A and tenon $b$.

Having thus fully described my invention, what I claim as new, and desire to secure by Letters Patent, is—

The scraper consisting of beam A, standard C, handles E E, rods G G, and share D, the said share being provided with projection $d$, which extends half-way up from its lower corner, all as set forth and described.

In testimony that I claim the foregoing as my own I affix my signature in presence of two witnesses.

<div style="text-align:right">
his<br>
GEORGE × MILLIORN.<br>
mark.
</div>

Witnesses,
  P. T. RAIFORD,
  I. M. HOLLAND.